United States Patent [19]

King et al.

[11] 4,447,116

[45] May 8, 1984

[54] CONTROLLABLE ELECTRO-OPTICAL MODULATOR/PHASE SHIFTER USING AN INTEGRATED OPTICAL INTERFEROMETER

[75] Inventors: George D. H. King, Walden; Michael C. Bone, Harlow, both of England

[73] Assignee: International Standard Electric Corporation, New York, N.Y.

[21] Appl. No.: 366,171

[22] Filed: Apr. 7, 1982

[30] Foreign Application Priority Data

Apr. 9, 1981 [GB] United Kingdom ............... 8111096

[51] Int. Cl.³ .............................................. G02B 5/172
[52] U.S. Cl. ............................... 350/96.13; 350/96.12
[58] Field of Search ........................... 350/96.13, 96.12

[56] References Cited

U.S. PATENT DOCUMENTS

| 4,070,092 | 1/1978 | Burn. | |
|---|---|---|---|
| 4,070,094 | 1/1978 | Martin | 350/96.14 |
| 4,340,272 | 7/1982 | Papuchon et al. | 350/96.14 |

Primary Examiner—David K. Moore
Assistant Examiner—Robert E. Wise
Attorney, Agent, or Firm—T. E. Kristofferson; W. T. O'Neil

[57] ABSTRACT

An optical waveguide interferometer arrangement includes a single-mode optical waveguide device which diverges into two waveguide branches of identical optical length which converge into another single waveguide. The optical properties of the two branches are variable by electrical fields applied via adjacent electrodes, which are energized with a composite waveform comprising (for example) a symmetrical ramp superimposed on a square wave of the same period. The two component waveforms are in phase but of different amplitudes such that the output light is intensity modulated at a frequency which is some multiple of that of the input waveforms. Adjustment of the square wave amplitude provides the means to phase shift the optical output signal.

4 Claims, 1 Drawing Figure

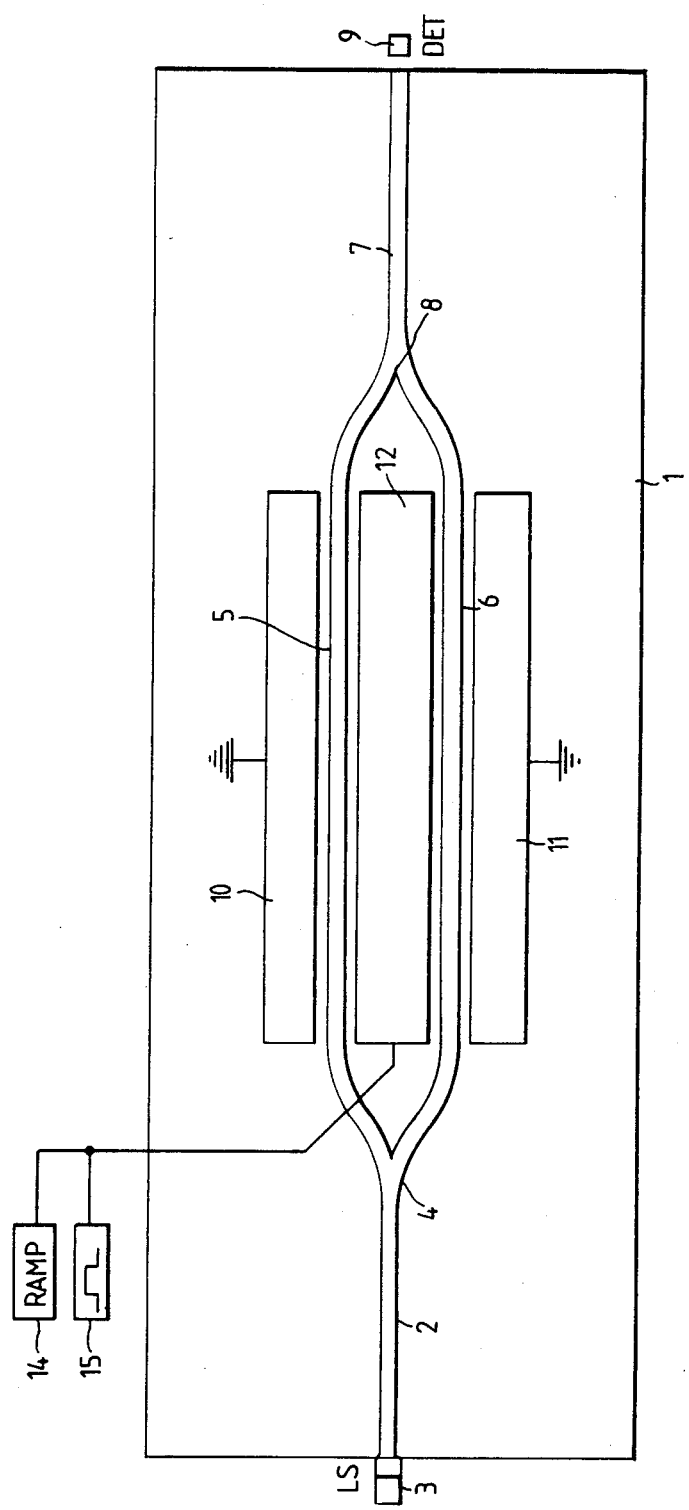

CONTROLLABLE ELECTRO-OPTICAL MODULATOR/PHASE SHIFTER USING AN INTEGRATED OPTICAL INTERFEROMETER

BACKGROUND OF THE INVENTION

1. Field of the Invention

The invention relates to an integrated optic device, for frequency up-conversion and phase shift control of high frequency signals.

2. Description of the Prior Art

An optical waveguide arrangement which operates in the manner of the interferometer to provide modulation and/or switching functions is known from U.S. Pat. No. 4,070,094. The theory, structure and fabrication method for optical waveguides integral with a substrate are known in the prior art and are referred to in the aforementioned U.S. Pat. No. 4,070,094 and the technical literature references in the specification of that patent. In that prior art structure, two optical waveguide branches having a common connection diverge along a substantially co-extensive distance, and reconverge to provide first and second light paths of identical optical length. Conductive electrodes are disposed contiguous to at least one of the optical waveguide branches and are connectable via a control switch to a source of electrical energy. In the absence of any electrical field, light energy entering the two branches propagates along identical optical path lengths and recombines constructively at the reconvergence of the branches. However, selectively applied electrical energy produces electrical fields in one or both of the branches to change the optical property of at least one of the branches, causing phase differences in the optical energy propagated in the branches, to produce at least partially destructive interference at the reconvergence of the two branches. Modulation is effected by varying the extent of the differences between the thus controlled optical properties of the two branches.

SUMMARY OF THE INVENTION

It may be said to be the general object of the invention to extend the operation of the optical waveguide arrangements of the general type referred to above in a unique structure.

According to the invention there is provided an optical waveguide interferometer arrangement including:

(a) an optical waveguide for transmitting single-mode optical energy;

(b) first and second single-mode optical waveguide branches defined by regions of increased refractive index in an electro-optically responsive material, which branches diverge from a common connection to said waveguide and reconverge to a further common connection to a further single-mode optical waveguide, said two branches forming first and second single-mode light paths of substantially identical optical length;

(c) conductive electrodes disposed contiguous to or adjacent to a portion of at least one said single-mode optical branch between its points of divergence and reconvergence;

(d) a first source of electrical energy from which a waveform of symmetrical ramp shape is applied to said electrodes so as to differentially vary the optical properties of the two branches, thus causing interference at said reconvergence, which interferences are periodically constructive and destructive so that the light leaving said reconvergence is intensity modulated with a sinusoidal waveform at a frequency which can be a multiple of that of the ramp waveform; said ramp waveform being adjusted in amplitude to give an integral number of half periods of the output modulation waveform, with a DC bias being provided to obtain a discontinuity free output waveform; and (e) a second source of electrical energy from which a waveform of rectangular shape is applied to the electrodes, the rectangular waveform having alternate ones of its half cycles in phase with one slope of the ramp and with the other slope of the ramp respectively, so that each said rectangular half-wave reinforces the said slope of the ramp waveform, the amplitude of said rectangular waveform being adjustable to provide for phase shift of the output signal while maintaining a discontinuity free waveform of the output signal leaving the point of reconvergence.

Although the instrumentation according to the invention is partly the same as shown in the aforementioned U.S. Pat. No. 4,070,094, the system of the invention builds on that prior art to provide a novel system with entirely new functions.

BRIEF DESCRIPTION OF THE DRAWINGS

A single drawing FIGURE which is a schematic block diagram of the arrangement according to the invention is presented.

DETAILED DESCRIPTION

The device shown and described is in essence a guided-wave version of the Mach-Zehnder optical interferometer, used in a novel arrangement. The substrate 1 is an electro-optic dielectric material such as lithium niobate ($LiNbO_3$) or lithium tantalate ($LiTaO_3$), which are especially suitable for use in integrated optics because of their high electro-optic co-efficient values and good optical transparency. The waveguides are formed by indiffusion of suitable materials such as titanium and nickel oxide to provide single-mode waveguides.

The waveguide pattern includes a first optical waveguide 2 which can be supplied with light from a source 3, e.g., a laser. This waveguide diverges at a point 4 into two branches 5, 6, which reconverge into a single waveguide 7 at a point 8. Aligned with the end of the waveguide 7 there is a light detector such as photo-transistor 9. The two light paths between the points 5 and 6 are of substantially identical optical length so that light reaching point 8 via the two paths will ideally recombine constructively.

Three electrodes are provided, which are coplanar with the waveguides, two of them, 10 and 11, being ground returned in the present arrangement. The central electrode 12 is connected to two electrical energy sources, one of which, 15, supplies a rectangular waveform, and the other of which, 14, supplies a ramp waveform. The ramp waveform is a triangular wave, while the rectangular waveform has its half cycles each aligned in time with one of the slopes of the ramp. Each half cycle is similarly poled as "seen" by the device so that it provides a level shift for the electrical energy applied to the middle electrode 12, and hence for the field which influences the guides.

Having briefly described the arrangement embodying the invention, we now consider its theory of operation.

The output intensity from the interferometer is a periodic function of the electrode voltage. This results from the variations in refractive index produced by the combined waveforms causing the recombined light wave produced in the waveguide 7 to be intensity modulated at a frequency which can be a multiple of the frequency of the ramp and of the square wave. Thus with a linear ramp input voltage we get a sinusoidal amplitude modulation of the optical output, and the modulation frequency is dependent on the slope of the ramp, and the design parameters used in the device. Since a single ramp of input voltage can yield many periods of the output modulation waveform, we thus obtain frequency up-conversion.

Since the slope of the ramp varies only the frequency of the output modulation, the amplitude of the ramp is set to obtain $n\pi$ radians of the output (where n is a positive non-zero integer) for $\pi$ radians of the input. The DC offset of the ramp is adjusted so that discontinuities in the output modulation waveform which would otherwise occur as a result of changes in sign of the slope of the ramp, are eliminated. Variation of the square wave amplitude produces a shift in the absolute phase of the output modulation while maintaining the discontinuity free nature of the output.

The device of the invention will be seen to provide a fast optical amplitude modulator found to be usable at output frequencies up to about 20 GHz. This is possible by virtue of the aforementioned inherent frequency up-version of the electrical input signal. The introduction of a low voltage square wave bias provides for controllable phase shifting of the output signal.

What is claimed is:

1. An optical waveguide interferometer arrangement including:
    an optical waveguide for transmitting single-mode optical energy;
    first and second single-mode optical waveguide branches defined by regions of increased refractive index in an electro-optically responsive substrate, which branches diverge from a common connection to said waveguide and reconverge to a further common connection to a further single-mode optical waveguide, said two branches forming first and second single-mode light paths of substantially identical optical length;
    conductive electrodes disposed adjacent to a portion of at least one of said single-mode optical branches between its points of divergence and reconvergence;
    a first source of electrical energy from which a waveform of symmetrical ramp shape is applied to said electrodes so as to differentially and cyclically vary the optical properties of the two branches, thus causing optical wave interferences at said reconvergence which are periodically constructive and destructive so that the light from said reconvergence is intensity modulated with a sinusoidal waveform at a frequency which can be a multiple of that of the ramp waveform; said ramp waveform being adjusted in amplitude to give an integral number of half periods of the output modulation waveform, a DC bias being provided to obtain a discontinuity free output waveform; and
    a second source of electrical energy from which a waveform of rectangular shape is applied to said electrodes, the rectangular waveform having alternate ones of its half cycles in phase with one slope of the ramp and with the other slope of the ramp respectively, so that each said rectangular half-wave reinforces the said slope of the ramp waveform, the amplitude of said rectangular waveform being adjustable to provide for phase shift of the output signal while maintaining a discontinuity free waveform of the output signal leaving the point of reconvergence.

2. An arrangement as claimed in claim 1, in which said two waveguide branches extend substantially parallel to each other, and in which said electrodes include a single electrode so located between the branches as to be adjacent to both said branches and two further electrodes one located adjacent to the side of each of said waveguide branches opposite from said single electrode.

3. An arrangement as claimed in claim 2, in which said two further electrodes are both connected to a reference potential such as ground and the two waveforms are connected to said single electrode.

4. An arrangement as set forth in claim 1, 2 or 3, in which said waveguides are formed by the indiffusion of titanium into said substrate and said substrate is of lithium niobate.

* * * * *